Jan. 10, 1939.  H. N. OTT  2,143,632
MICROSCOPE
Filed Nov. 16, 1935  2 Sheets-Sheet 1
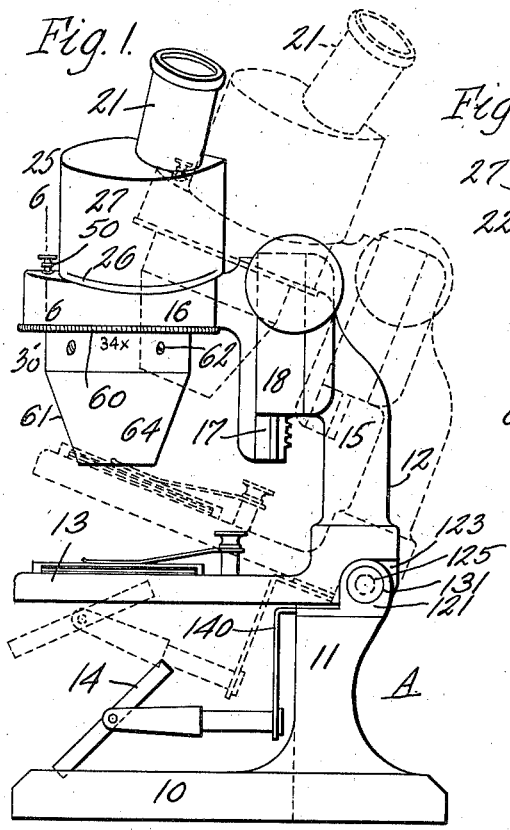
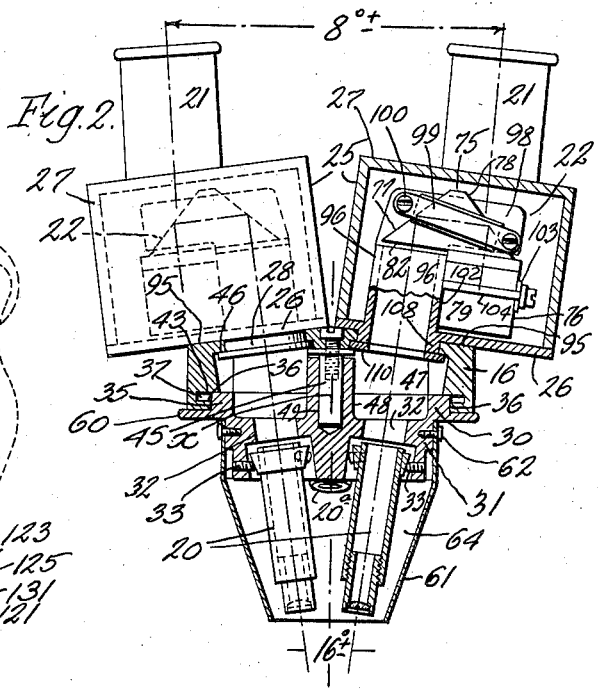
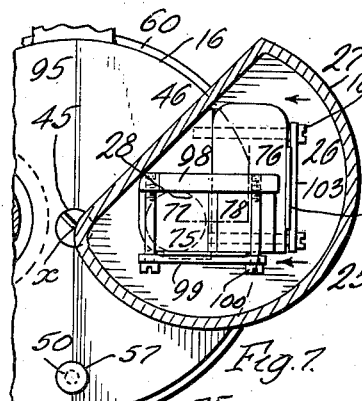
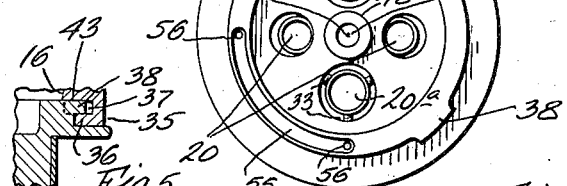
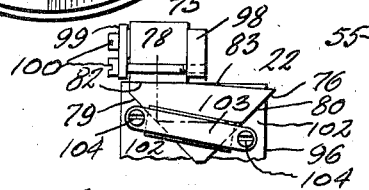
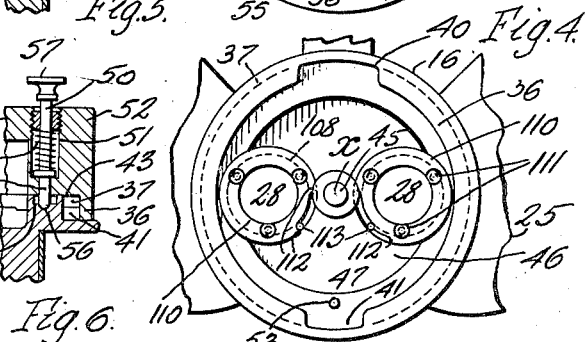
INVENTOR.
Harvey N. Ott
Parker, Prochnow & Farmer
ATTORNEYS.

Jan. 10, 1939.  H. N. OTT  2,143,632
MICROSCOPE
Filed Nov. 16, 1935   2 Sheets-Sheet 2
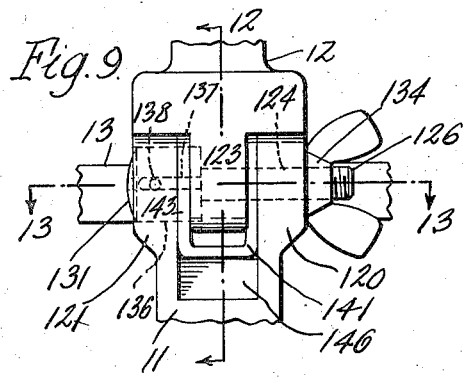
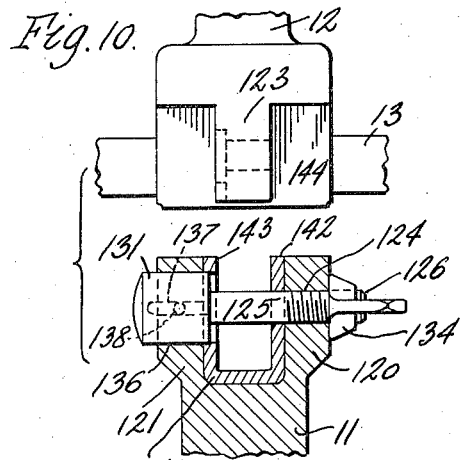
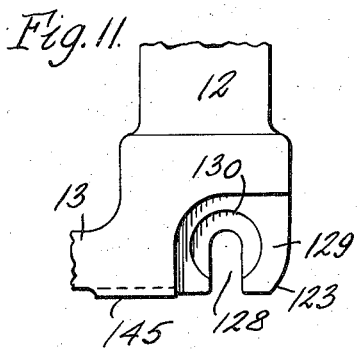
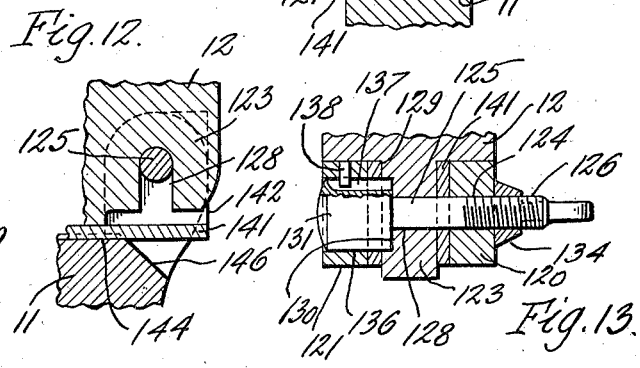
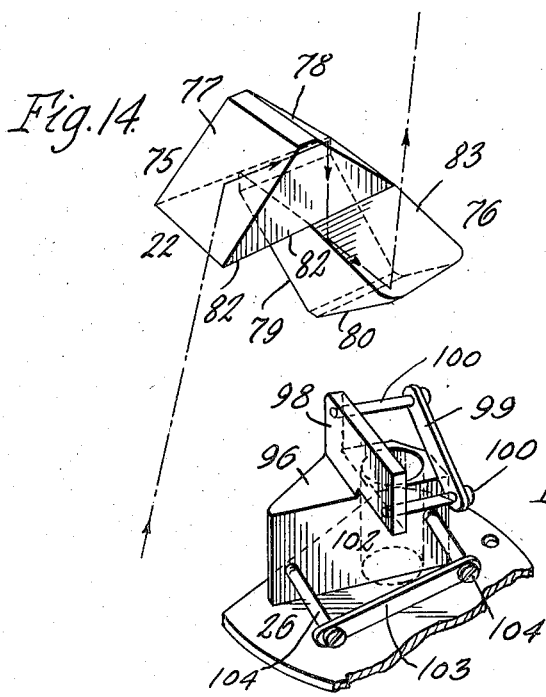
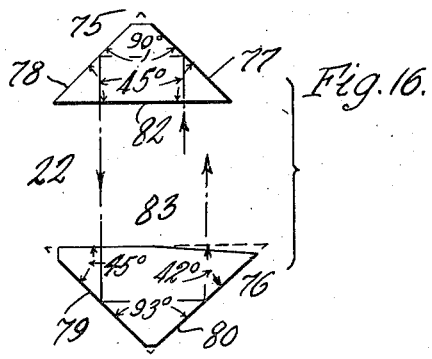
INVENTOR.
Harvey N. Ott
Parker, Prochnow & Farmer
ATTORNEYS.

Patented Jan. 10, 1939

2,143,632

UNITED STATES PATENT OFFICE 2,143,632

MICROSCOPE

Harvey N. Ott, Buffalo, N. Y., assignor to Spencer Lens Company, Buffalo, N. Y.

Application November 16, 1935, Serial No. 50,165

7 Claims. (Cl. 88—39)

This invention relates to microscopes.

The general object of the invention is to provide an improved microscope which is of compact construction, relatively inexpensive as compared with other instruments capable of performing similar work, and is particularly adaptable for a wide variety of uses.

More particular objects of this invention are to construct a binocular microscope in which a plurality of pairs of objectives are mounted in a novel and superior manner, so that any desired pair of objectives can be easily, quickly and accurately positioned in operative relation to the oculars; to provide an improved mounting for a plurality of pairs of objectives such that an instrument may be provided with a relatively large number of pairs of objectives secured upon a series of removable and interchangeable holders or mounts, any one of which can be easily and quickly secured to or detached from the instrument and replaced by another of such holders or mounts; also to construct a binocular microscope in which the holders or mounts for the pairs of objectives can be secured to the instrument in a more rugged and secure or stable manner than heretofore, so as to thereby assure and maintain accurate alignment of the objectives with the rest of the optical system of the instrument.

A further object of this invention is to provide a binocular microscope with novel, improved and simplified reflecting means for changing the angle of the image rays from one angle at the paired objectives to another angle at the oculars.

Another object of the invention is to provide microscopes with an improved inclination joint which not only performs the usual functions of a joint of this kind but which also forms a quick detachable connection which facilitates the easy and quick separation of the connected parts by a simple manipulation of such joint.

Various other objects and advantages of the invention will be apparent from the following description of an embodiment thereof and the novel features of the invention will be particularly set forth in connection with the appended claims.

In the drawings:

Fig. 1 is a side elevation of a microscope in which the several features of my invention are embodied and showing in broken lines, portions of the instrument tilted to a different position;

Fig. 2 is a face view of a portion of the instrument, with parts thereof in section, and illustrating particularly the detachable holder or mount for a plurality of paired objectives;

Fig. 3 is a top plan view of one of my improved holders or mounts for a plurality of pairs of objectives;

Fig. 4 is a bottom plan view of a portion of the body of the instrument illustrating, in part, the detachable connection for the objective mount;

Fig. 5 is a fragmentary vertical section showing a portion of the connection between an objective mount and the body of the instrument;

Fig. 6 is a similar section illustrating a movable stop or abutment for facilitating the positioning of a desired pair of objectives in operative relation to the oculars and which is operable to effect detachment of an objective holder or mount from the instrument;

Fig. 7 is a plan view, partly in section, of one of the reflecting systems of the instrument, mounted in its housing;

Fig. 8 is a side elevation thereof, taken in the direction of the arrows, Fig. 7;

Fig. 9 is a rear elevation of the combined inclination joint and detachable connection between the base and the arm of the instrument;

Fig. 10 is a similar view, partly in section, showing the arm and base disconnected from one another;

Fig. 11 is a fragmentary side elevation showing that portion of the arm which forms part of the inclination joint;

Fig. 12 is a vertical section of the inclination joint on line 12—12, Fig. 9;

Fig. 13 is a horizontal section thereof on line 13—13, Fig. 9;

Fig. 14 is a perspective view of two prisms forming one of the reflecting means of the instrument, detached from their mountings, and illustrating the path of light rays therethrough from one of the objectives to its associated ocular;

Fig. 15 is a perspective view of a mounting for the prisms of Fig. 14;

Fig. 16 is a diagrammatic representation of the prisms showing the passage of a light ray therethrough.

The various features of the present invention are illustrated in Fig. 1 of the drawings in connection with a binocular microscope which, in general, can be of any suitable construction. The instrument shown includes a base A having a horizontal foot or supporting portion 10 and a post 11 extending upwardly therefrom. Movably secured to the upper end of the post 11 is an arm or bracket 12, the lower end of which has formed on or secured thereto a stage 13 which extends over the foot 10 of the instrument and upon which objects to be examined may be supported.

Between the stage 13 of the foot 10, an adjustable mirror or reflector 14 of usual construction may be disposed for use in examining transparent objects upon the stage 13.

The arm 12 as shown, may be formed in two parts including an upright relatively stationary part 15 and an overhanging guide part 18 which forms a support for a body 16 carrying the optical system of the instrument. This body 16 is adjustably secured to the part 15 for up and down movements to facilitate the positioning of the optical system with reference to the stage by an upright slide 17 movable in a guide in the part 18 under the control of rack and pinion adjusting means as is usual in instruments of this sort.

The optical system of the instrument includes one or more sets of paired objectives, one pair 20 of which is illustrated in Fig. 2, and a pair of oculars or eyepiece tubes 21. Disposed between each objective 20 and one of the oculars 21 is a reflecting system 22 so positioned that image rays passing upwardly through an objective 20 are diverted by the associated reflecting system 22 and reflected to the companion ocular 21 at an angle different to that of the image rays at the objective. The reflecting systems 22 also erect the images.

Each reflecting system 22 is mounted in a housing 25 which includes a base 26 and a cap or cover portion 27. The prism housings 25 are substantially of cylindrical form and the base 26 of each housing is rotatably connected to the top of the body member 16 by a hollow swivel connection 28 which is concentric with the axis of the related objective 20. Each eyepiece tube or ocular 21 is mounted eccentrically of the swivel connection of its supporting housing 25 upon the top wall of the housing and, by rotating the housings 25 about their swivel connections 28, the oculars 21 may be moved towards and from each other so that they may be adjusted to suit the pupillary distances of the eyes of different users of the instrument. The arrangement so far described is, in general, that used in binocular microscopes and, of itself, forms no part of the present invention.

In accordance with this invention, I provide one or more detachable holders or mounts for supporting a plurality of pairs of objectives in such a manner that the two objectives of each pair are disposed at diametrically opposite sides of a common axis about which the holder or mount can be rotated so as to place any pair of objectives on the mount in operative relation to the rest of the optical system of the instrument by a concentric rotative movement of the objectives about said common axis.

One of these mounts is illustrated in Figs. 2 and 3 as being provided with two pairs of the objectives, one pair being designated by the numeral 20 and the other pair, for convenience, by the numeral 20a, and upon reference to Fig. 3, it will be seen that each objective is disposed with its axis at the same distance from a common pivotal center $x$ as all of the other objectives, and as shown, the objectives are spaced at an angle of 90° apart upon a circle having the pivotal axis $x$ as its center, so that the objectives of each pair are at diametrically opposite sides of that axis. Thus each objective of any pair is disposed between objectives of another pair.

In order to produce the desired stereoscopic effect, the axes of the two objectives 20 or 20a of each pair may be arranged at a suitable angle, for example, about 16° apart and are preferably so disposed that the common pivotal axis $x$ bisects the 16° angle between all pairs of objectives.

On the other hand the two oculars 21 are each disposed so that the angle between them is considerably less than 16°, say approximately 8°, whereby the user of the instrument can view objects through the instrument at a more convenient or comfortable angle, that is, an angle which is approximately that of his eyes when making notes or observations adjacent the instrument, the oculars, at the same time being slightly inclined toward the user.

The adjustable and detachable holder or mount for the pairs of objectives includes a transversely disposed plate-like member or web 30 having an annular, depending part 31 of reduced diameter through which extends a plurality of holes or apertures 32. In each of these holes an objective 20 or 20a is rigidly secured, with its axis at the desired angle, by screws or adjustable fastenings 33. At the upper face of the holder or mount 30 there is an upwardly extending shouldered or annular part 35 which is received and slidably and rotatably fits in an inwardly extending annular seat or flange 36 formed at the lower edge of the peripheral depending wall of the body 16 on the arm 12. In the upright wall of this seat or flange 36 is an annular groove or recess 37 of larger diameter than the opening within the flange 36 for the reception of a pair of diametrically opposed lateral extensions or ears 38 formed upon the part 35 of the holder, and which, when the parts are in operative position, act as a form of bayonet joint to complete an interlocking connection between the holder and the body 16. To enable the mount to be inserted and secured in or removed from its seat in the arm, diametrically opposite portions of the flange or seat 36 are cut away to form notches 40 and 41, as shown in Fig. 4. When the holder is to be secured in position, the lugs or ears 38 are moved opposite to and passed through these recesses 40 and 41, and then by rotating the mount, the ears enter into the recess 37, thus holding the objective mount in place on the part 16, against an annular abutment 43 on the part 16.

To facilitate the proper centering of the mount with reference to the seat in the body 16 and to assure a firm, stable connection by which the objectives will be retained in correct alignment with the oculars, I preferably provide suitable centering means arranged upon the axis of rotation $x$ of the holder or mount. In the construction shown, such means includes a fixed depending stud 45 which is positioned upon the axis $x$ and extends downwardly from the top wall 46 of the part 16 through the central cavity or chamber 47 thereof, with the lower end of the stud preferably positioned somewhat below the plane of the bottom face of the flange or seat 36. Extending upwardly from the central portion of each holder or mount 30 is a central boss or projection 48 having an axial bore 49 which is formed to be engaged upon and rotatably fit the stud 45. When a mount is to be attached to the instrument, the boss 48 is slid upwardly on the stud 45, thereby guiding the part 35 of the mount into its seat 36.

In order to properly locate the different pairs of objectives in operative relation to the oculars, I provide suitable means for arresting the turning movements of the holder or mount 30 when a pair of objectives assume their correct position and which indicate when the objectives are so positioned. The means for this purpose, in the construction shown, includes an upright spring pressed stud or plunger 50, see Fig. 6, which is arranged in a hole 51 in the depending wall 52 of the body 16 in such manner that an extension 53 of the member 50 is normally, yieldingly held by a spring 54 in position to project downwardly beyond the bottom face of the abutment 43. When the holder 30 is to be attached it is held so that the ears or lugs 38 are opposite the recesses 40 and 41, with the top face of the shoulder 35 of the holder abutting the projection 53. Before the holder can be passed into its seat and the lugs 38 moved opposite the recesses 37 the plunger 50 must be moved upwardly against the action of its spring to a position in which the shoulder 35 engages the abutment 43. When this has been done, the mount 30 can be rotated so as to engage the ears or lugs 38 over the flange or seat 36, and during this rotation the projection 53 of the plunger 50 will ride upon the face of the shoulder or extension 35 until the rotation of the holder brings an end of an annular groove or recess 55 formed in the top face of the shoulder 35 into alinement with the projection 53. The groove 55 is formed concentrically with the axis $x$ of rotation, or, in other words, with the stud 45, and the groove is provided at each end thereof with a depressed rounded seat or hole 56. Each of these holes is disposed on a line which passes diametrically from the axis of rotation through the axis of one objective of each of the pairs of the objectives 20, 20a and the holes are spaced at 90° apart, see Fig. 3.

When, therefore, the projection 53 of the plunger 50 drops into the groove 55 by the rotation of the holder in applying it to the instrument, it will at once enter the seat or depression 56 at the end of the groove which first approaches the stud, thereby accurately alining one pair of objectives with the oculars 21. If or when this pair of objectives is not desired for use, rotation of the mount in the appropriate direction will cause the projection 53 to be forced out of the seat 56 in which it is engaged, whereupon it will ride upon the bottom of the groove 55 until the other seat or depression 56 is moved beneath the projection. The projection will then at once snap into this other seat 56, which automatically places the other pair of objectives in operative position with the oculars. It should be understood that the groove 55 and its seats 56 are so positioned on the holder that proper alinement of the objectives with the oculars is positively assured.

By this construction, the mount, after being attached in the manner explained, can be shifted back and forth through an angle of 90° and at either end of this path of movement, the extension 53 of the plunger 50 will snap into the seat 56 at that end of the groove 55 and thereby releasably position the mount so that the desired pair of objectives are in correct relation to the oculars. Only very slight force is required to shift the projection 53 out of the seats 56 and should an attempt be made to turn the mount in the wrong direction, such improper rotation will be prevented by the engagement of the projection 53 with the adjacent end of the groove 55.

The above construction provides means whereby an easy and quick adjustment to position any pair of objectives on the holder in operative relation to the oculars may be made, while incorrect turning of the mount or disconnection thereof from its support 16 is prevented, since the rotation of the holder is limited by the length of the groove to a quarter turn and this is not sufficient to place the lugs 38 opposite the notches 40, 41. However, when it is desired to detach the mount 30 for replacing it with another mount or for any other reason, this can be instantly done by manually retracting the plunger 50 by means of its handle 57 against the action of its spring to a position in which the lower end of the projection 53 is moved into or above the plane of the top face of the annular shoulder 35 of the holder, whereupon the holder can be turned to move the lugs or ears 38 opposite the notches 40 and 41 in the seat 36, and the holder detached or withdrawn by a downward movement.

In order to enable the holder or mount to be attached with the least rotary movement or effort, I preferably form the lug or ear 38 on the holder and one of the notches 40 and 41 on the part 16 of different dimensions or widths to the other ear or notch so that the holder must be placed in one definite position relative to the part 16 before the lugs can be inserted through these notches. The relation of the groove 55 to the lugs 38 is such that when the lugs are placed opposite the proper notches, a very slight, normal or right-hand turning movement of the holder brings one end of the groove 55 beneath the projection 53 of the plunger 50. For convenience, in rotating the holder 30, an extended lateral flange 60 having a knurled edge is provided thereon, said edge extending beyond the periphery of the part 16 so that it may be readily grasped and the holder or mounted rotated.

From the foregoing, it will be seen that the holders are of compact form and the objectives are grouped closely about the pivotal axis of the holder with an objective of each pair disposed between objectives of another pair and all parts of the holder and the objectives thereon are disposed within the limits of the supporting part of the arm. Thus the parts do not project outwardly into a position where they may be struck and forced out of their accurate relation to the ocular systems.

I also preferably provide means for protecting the depending or protruding portions of the oculars 20, this being done in the construction illustrated by the provision of a sheath or hood 61 which includes an upper cylindrical wall which fits about the lower portion 31 of the holder and is attached thereto by screws or fastenings 62. Extending downwardly from this annular portion is a conical or tapered part 64, the lower open end of which terminates in a plane below the lower ends of the longest objectives 20 or 20a. Other means, however, may be provided for this purpose.

If desired, suitable indicia, see Fig. 1, indicative of the magnification of the objectives, or other means of identification therefor, can be placed upon the outside face of the hood 60 in position for easy observation and located so that the user will know which pair of objectives is being moved into operative position.

Each of the reflecting means or systems 22, before mentioned, includes two reflecting units or structures, each having a pair of opposed, angularly related reflecting surfaces disposed so that image rays passing upwardly through an objective 20 is intercepted by a reflecting surface of one of said units and are diverted therefrom to the other surface of that unit in a path lateral to the axis of that objective, and are then in turn diverted back along a path towards the objective to one of the reflecting faces of the other unit, from which the rays are, in turn, reflected to the other face of that unit. The rays are then diverted upwardly by that face through the associated ocular 21 but at a different angle to the path of the rays through the objective, and during the passage of the rays through the reflecting means or system 22, the image is erected.

In the construction illustrated, the reflecting units of each reflecting system 22 comprises a pair of prisms 75 and 76 rigidly mounted upon the base 26 of the housing for the system. The prism 75 has two reflecting faces 77 and 78 which are arranged so that the angle between them faces towards the objective with which it is associated and is so disposed that the face 77 thereof extends obliquely across the axis of that objective, while the other reflecting face 78 is disposed laterally of said axis. The other prism or unit 76 is also formed with two opposed reflecting surfaces 79 and 80 so that the angle between them faces upwardly towards the associated ocular 21 with the face 80 extending obliquely across the axis of that ocular. The prisms or units 75 and 76 are completed by faces 82 and 83 extending across the angles of the prisms. The two prisms of each system are disposed crosswise of and at right angles to each other with approximately half of the face 82 of the prism 75 extending parallel with and preferably engaging upon approximately half of the face 83 of the prism 76 as shown clearly in Fig. 14. The other portion of the face 83 is cut away at a slight angle or taper as shown in Figs. 8 and 16 so that this portion, which faces the ocular 21, will be normal to the axis of that ocular to thereby avoid distortion of the image by refraction. By this arrangement it will be seen upon reference to Fig. 14 that a ray of light passing upwardly from the objective first impinges upon the oblique face 77 of the prism 75, is diverted transversely thereby to the opposed face 78 which in turn reflects the ray downwardly through the abutting portions of the faces 82 and 83 of the two prisms. The ray continues through those faces to the oblique face 79 of the prism 76, is diverted thereby in a lateral direction (but at right angles to the direction in which it was first directed laterally by the face 77) until it is intercepted by the last oblique face 80 of the prism 76. Here it is reflected upwardly through the ocular.

In order to change the angle between the rays passing through a pair of objectives which, as above stated, may be approximately 16° to a different angle, say an angle of approximately 8° between the oculars I form one of the prisms, of each reflecting system, for example, the prism 76 so that the angle between the reflecting faces thereof is greater than a right angle, for example, 93°, while the corresponding angle of the prism 75 is 90°.

As will be seen from an examination of Figs. 1 and 2, the top face 95 of the part 16 of the body is divided into two portions which are slightly inclined in opposite directions from front to rear of the instrument from a line passing through the axis $x$ and these inclined face planes and normal or at right angles to the axes of the objectives, and the base 26 of the housings 25 are in parallel relation to these faces. The prism systems 22 in said housings 25 are rigidly mounted so as to turn with the housings, and since, as before stated, the swivel connections 28 are concentric with the axes of the objectives, the angle at which the image rays leave the reflecting systems and pass into the oculars will remain the same with reference to the axis of the objectives in any position to which the housings and oculars are turned for adjusting the pupillary distance between the oculars.

However, in the movement of the oculars towards and from one another in their adjustments to different pupillary distances the angle between the axes of the oculars will change slightly. The maximum change in use, however, is relatively small, say from an angle of about 7° to an angle of about 9° or 10°.

This variation is of advantage in that a person having a relatively narrow pupillary distance will normally see things at close range through a narrower stereoscopic angle than a person having a wider pupillary distance, and vice versa.

The reflecting means or prism system 22 can be rigidly mounted in the housings 25 in any suitable way. As shown in the drawings, see Figs. 2, 7 and 15, I provide the base 26 of each housing with an upstanding, hollow boss or sleeve 96 which is apertured concentrically with the swivel connection for that housing, and this boss terminates in a flat face across which an end of the prism 75 extends so as to position the reflecting face 77 thereof to intercept the rays from the associated objective. This prism 75 is rigidly secured in this position between a fixed or integral plate 98 extending upwardly from the boss 96, and a clamping bar 99 which is secured to the plate 98 by screws 100. The other prism 76 is secured between a flat face 102 on the boss 96 and a clamping bar 103 as by screws 104. The swivel connection between each housing and the part 16 of the body may be constructed by the provision of a downwardly extending annular shoulder 108 formed on the bottom or base 26 of the prism housing and which rotatably fits in a hole extending through the top wall of said part 16. A ring or retaining member 110 abutting the bottom face of the shoulder 108 and the adjacent bottom face of the wall of said arm part 16 acts to retain the housing in rotatable connected relation to the part 16. The ring or member 110 may be secured to the shouldered part 108 by screws 111.

To limit the rotary movement of each housing 25 with relation to the part 16, I cut away a portion of each of the rings or members 110 so as to provide spaced shoulders or stops 112 thereon, see Fig. 4, which are movable into and out of contact with a fixed stop or abutment 113 projecting downwardly from the top wall of the part 16, as the housings are turned to position the oculars towards and from each other. Any other means may be provided for this purpose.

When a microscope is provided with objectives of relatively low power and long focus, the instrument may be used for the examination of relatively large, irregular objects such as rocks or minerals, pieces of wood and other specimens, and at times it is inconvenient or impossible to place such objects upon the stage of the instrument owing to the size of the objects.

Microscopes have been provided for this purpose in which the bases have been omitted so that the stage of the instrument can be applied directly to a large object to be examined. In such cases the stage may also be provided with means for supporting a glass plate or member upon which slides or other small objects can be placed for examination but such an instrument is not adapted for the examination of objects so placed, by reflected light as is the case where the instrument is provided with the usual stage disposed above the base or foot of the instrument so that a mirror or reflecting member can be interposed therebetween, as is illustrated in the instrument of Fig. 1.

In accordance with this invention, I provide means whereby the complete instrument, as shown in Fig. 1, can be used for examination of objects upon the stage 13 and whereby the arm 12 together with its stage 13, and the optical system can be easily and quickly detached from or secured to the post 11 of the base A. In this way, when the arm 12 and stage 13 are disconnected from the base A, the stage 13 may be used as the base or support for the instrument, either upon a table or other resting place, or it may be directly applied to a relatively large more or less irregular object for direct examination of that object. The stage 13, therefore, is preferably made similar in shape to the base or foot 10, both being of the conventional horse-shoe form.

I prefer to make such connection in the nature of a hinge joint so that it also performs the additional function of the usual inclination joint to enable the arm, stage and optical system to be tilted relatively to the base, as shown in broken lines in Fig. 1.

This combined inclination joint and quick detachable connection, includes at least one lug or part on the arm 12 and on the base A which overrun each other and are connected by a pivot member to form a hinge structure. As shown, particularly in Figs. 2 to 6 inclusive, I bifurcate the upper end of the post 11 to form a pair of upstanding spaced lugs 120, 121 between which is received a depending lug 123 on the arm 12. A transverse hole 124 is formed in the lug 120 in which the shank 125 of a pivot or stud 126 slidably engages. The shank 125 also normally engages in the bottom of a notch 128 formed in the lug 123 of the arm 12, the open end of which preferably extends downwardly. In that transverse face 129 of the lug 123 which is remote from the lug 120, I form an annular seat or depression 130 into which a head or enlargement 131 upon one end of the stud 126 may fit. The opposite end of the stud 126 extends out of the hole 124 beyond the outer side of the lug 120 and is threaded for the reception of a thumb nut or clamping device 134, which, when turned in the appropriate direction, will draw the head 131 of the stud firmly into the seat 130, thereby pivotally connecting the arm and post and preventing the disconnection of the shank of the stud from the slot 128. However, upon releasing or unscrewing the nut 134 so as to back it out of engagement with the lug 120, the stud 126 can be moved endwise to a position in which the head 131 entirely clears or is free of the seat 130. In this position of the stud, the arm 12 and its associated parts can be withdrawn from the joint or connection by the withdrawal of the lug 123 from the stud by way of the open slot 128.

When thus separated the arm 12, stage 13 and the optical system still form a complete microscope, the stage 13 now functioning as the base of the instrument, since it can act as a support therefor, or can be engaged directly with a large uneven surface, such as a rock in the field which, while too large to transport, can nevertheless be examined.

By carrying out the aforementioned manipulations in reverse order, the arm and post can be easily and quickly united.

While in principle, the joint just described would function with only the apertured lug 120 and lug 123 with its slot 128 and seat 130, I preferably provide the other lug 121 of the post 11 with a hole 136 into which the head 131 on the stud can extend so as to thereby form a more secure and stable bearing between the base and the arm. To prevent rotation of the stud 126, when manipulating the nut 134, I preferably form in a side of the head 131 a longitudinal groove 137 into which extends a fixed pin or projection 138 secured in the lug 121 and projecting into the hole 136 thereof. By this arrangement, the stud is prevented from rotation, not only during the use of the connection as an inclination joint to thereby prevent loosening of the nut 134 but also during endwise movement of the stud when manipulating the parts to effect separation of the arm from the base.

In the construction illustrated, the stud 126 may be conveniently used as a support for the bracket 140 of the mirror or reflecting member 14. For this purpose the upper end of the bracket 140 is offset, and at its free end is formed a stirrup 141 which includes two spaced lugs 142 and 143. These lugs are proportioned to fit in the space between the lugs 120 and 121 of the post 11 and the lugs 142 are apertured for the passage therethrough of the shank 125 and head 131 respectively of the stud 126.

To limit the relative movement between the arm 12 and the base A and maintain the arm and parts carried thereby in the upright position shown in Fig. 1, the post 11 may be formed with a shoulder 144 which abuts against an opposed shoulder 145 upon the bottom of the arm at one side of the inclination joint, while the movement of the arm, stage, and other adjustable parts to an inclined position is limited by the engagement of the bottom face of the part of the stirrup 141 with an inclined face abutment 146 on the post 11. The abutting faces 144 and 145 of the arm and post respectively may be slotted or cut away to make room for the offset portion of the bracket 140.

While the mirror bracket is conveniently mounted by the arrangement just described it can, if desired, be connected to some other part of the instrument, in which case the lugs 120, 121 of the base, and the lug 123 of the arm may be arranged in direct contact.

I claim as my invention:

1. In a binocular microscope, a body for supporting a pair of optical systems, the optical axes of which converge, a holder, a pivotal connection between said holder and said body, sets of paired objectives mounted upon said holder and grouped about the axis of said pivot with one objective of each pair disposed between objectives of another pair, a groove in said holder disposed concentrically about said pivotal axis and upon the bottom of which a spring pressed member mounted in said body abuts, seats in said groove which are disposed upon lines passing through the two objectives of adjacent pairs and meeting upon said pivotal axis, and means for effecting relative rotation between said holder and said body about said axis, whereby when said holder is rotated, said spring pressed member will engage in one or the other of said seats and position a pair of objectives in operative relation to said ocular systems.

2. In a binocular microscope having two sets of optical elements, a body having a circular flange of relatively large diameter, a pivot projecting from said body coincident with the longitudinal axis of said flange, a substantially circular holder having a central socket for receiving said pivot for rotatably mounting said holder, and annular part on said holder which rotatably engages said body flange, means connecting said annular part and said body flange in a manner to enable said holder to rotate about said pivot, and sets of paired objectives mounted upon said holder and grouped concentrically about said pivot between said pivot and said annular part with one objective of each pair disposed between objectives of another pair, and with the individual objectives of each pair disposed at diametrically opposite sides of said pivot whereby a selected pair of said objectives may be placed into and out of operative relation to said two sets of optical elements by rotating said holder relatively to said body.

3. In a microscope, a body having a substantially circular flange of relatively large diameter, a detachable objective holder having a marginal, substantially circular flange which fits within and rotatably engages said body flange, a pivotal connection between said holder and said body disposed concentrically upon the common axis of said holder and body flange and comprising a stud projecting from one of said members, a socket on the other member in which said stud may be slidably engaged for locating said holder on said body, said body flange and said holder flange having diametrically opposed interfitting parts for supporting said holder on said body and maintaining its pivotal connection therewith, and objectives mounted on said holder in a circular series about and concentric with said pivot between said pivot and said marginal parts of said holder and body with the objectives of each pair at diametrically opposite sides of said pivot.

4. In a microscope, a body having a substantially circular flange of relatively large diameter, a detachable objective holder having a marginal, substantially circular flange which fits within and rotatably engages said body flange, a separable pivotal connection between said holder and body comprising a stud projecting from said body upon the axis of and concentric with said marginal body flange and a socket on said holder similarly disposed with relation to its marginal flange and which is engageable with said pivot stud by an endwise movement of said holder for guiding said holder flange into operable relation to said body flange, said body flange having laterally disposed notches therein and said holder flange having laterally extending ears, which upon engaging said socket upon said pivot stud, enter said notches of said body flange, and said latter flange and said ears being relatively disposed so that upon subsequent rotary movement of said holder about said pivotal connection, said ears will engage upon said flange to support said holder upon said body, and said holder having thereon a series of objectives disposed about said pivotal connection and between said socket and its marginal flange.

5. In a microscope, a body having a pivot stud extending therefrom, a flange concentrically disposed about said pivot in spaced relation thereto, a holder having a socket which fits upon and is rotatable about said stud, a marginal flange on said holder concentric with said socket and operatively engageable with said body flange, means rotatably connecting said flange so that said holder may turn about said stud, said body having thereon a pair of optical systems disposed with their axes at diametrically opposite sides of said pivot and equidistant from the axis thereof, said holder having thereon a plurality of sets of paired objectives grouped concentrically about said pivot with their axes upon a circle coincident with the axes of said two optical systems and with the objectives of each pair disposed at diametrically opposite sides of said pivot, whereby upon turning said holder a selected pair of objectives may be axially and operatively alined with said two optical systems, and parts on said body and holder respectively which upon completion of a turning movement of said holder which places a selected pair of objectives in the relation stated, are engageable to arrest said turning movement of and retain said holder and objectives in that operative position.

6. In a binocular microscope, a body having a pivot stud projecting therefrom, a holder rotatably mounted upon said stud to turn relatively to said body, a pair of optical systems on said body so disposed that the axis of said pivot stud lies in a plane common to the axes of said two systems and midway between said axes, and said holder having mounted thereon sets of paired objectives, these being disposed so that the axes of the individual objectives of each pair are at opposite sides of said holder and of said pivot and are equidistant from the latter, the position of said objectives being such that a circle concentric with said pivot and passing through the axes of all of said objectives will register at diametrically opposite sides of said pivot with the axes of said two optical systems, so that by turning said holder, two diametrically opposed objectives may be operatively alined with said two systems.

7. In a binocular microscope, a body, a pivot extending therefrom, a pair of optical systems on said body disposed at opposite sides of and equidistant from said pivot with the axis of the latter in a plane common to the axes of both optical systems, a detachable objective holder rotatably connectd to said pivot, and said holder having mounted thereon a set of two paired objectives also disposed at opposite sides of and equidistant from said pivot with the axis of the latter in a plane common to the axes of said two objectives, and said objectives being so spaced that their axes will move into or out of operative registration with the axes of said optical systems by rotating said holder on said pivot.

HARVEY N. OTT.